United States Patent
Oshiro et al.

(10) Patent No.: US 8,726,724 B2
(45) Date of Patent: May 20, 2014

(54) SYSTEM, METHOD, AND PROGRAM FOR DETECTING DEFLATED TIRES

(75) Inventors: Yuji Oshiro, Kobe (JP); Seigou Sakagami, Ashiya (JP); Masashi Kitano, Kobe (JP); Hiroaki Kawasaki, Ashiya (JP); Tomonori Sakai, Tochigi-ken (JP); Shinya Notomi, Sakura (JP); Kazunari Okada, Tochigi-ken (JP)

(73) Assignees: Sumitomo Rubber Industries, Ltd., Kobe (JP); Honda Motor Co., Ltd., Tokyo (JP)

( * ) Notice: Subject to any disclaimer, the term of this patent is extended or adjusted under 35 U.S.C. 154(b) by 161 days.

(21) Appl. No.: 13/483,695

(22) Filed: May 30, 2012

(65) Prior Publication Data

US 2012/0304754 A1    Dec. 6, 2012

(30) Foreign Application Priority Data

Jun. 3, 2011   (JP) ................................. 2011-125086

(51) Int. Cl.
| | |
|---|---|
| G01M 17/02 | (2006.01) |
| G08B 21/00 | (2006.01) |
| G06F 19/00 | (2011.01) |

(52) U.S. Cl.
USPC ............... 73/146; 73/146.5; 702/50; 340/443

(58) Field of Classification Search
None
See application file for complete search history.

(56) References Cited

U.S. PATENT DOCUMENTS

| | | | | |
|---|---|---|---|---|
| 2010/0013616 A1* | 1/2010 | Fujita et al. | ................... | 340/443 |
| 2010/0013617 A1* | 1/2010 | Fujita et al. | ................... | 340/443 |
| 2010/0164704 A1 | 7/2010 | Lindskog et al. | | |
| 2010/0217542 A1* | 8/2010 | Fujita et al. | ..................... | 702/50 |
| 2010/0225463 A1* | 9/2010 | Fujita et al. | ................... | 340/443 |
| 2011/0107828 A1* | 5/2011 | Kawasaki | ..................... | 73/146.2 |
| 2012/0245787 A1* | 9/2012 | Kawasaki | ..................... | 701/29.1 |
| 2013/0321138 A1* | 12/2013 | Sakagami et al. | ............ | 340/442 |

FOREIGN PATENT DOCUMENTS

| | | |
|---|---|---|
| DE | 10 2005 004 910 A1 | 9/2005 |
| JP | 63-305011 A | 12/1988 |
| JP | 07-125511 A | 5/1995 |
| JP | 09-156327 A | 6/1997 |
| JP | 2003-312222 A | 11/2003 |
| JP | 2004-161022 A | 6/2004 |
| JP | 2009-274639 A | 11/2009 |
| JP | 2010-521366 A | 6/2010 |

* cited by examiner

*Primary Examiner* — Andre Allen
(74) *Attorney, Agent, or Firm* — Birch, Stewart, Kolasch & Birch, LLP

(57) ABSTRACT

A system detects deflated tires based on a resonance frequency of tires with a vehicle and a relative comparison value of rotation speeds of the tires. The system includes: a rotation information detection means for detecting rotation information of the tires; a rotation speed calculation means for calculating rotation speeds of the tires; a resonance frequency assumption means for assuming a resonance frequency of the tires; and a determination means for detection of deflated tires using a decreased pressure determination index calculated by a relative comparison of the rotation speeds of the tires and the resonance frequency. The determination means is so configured as to reduce the second threshold to be compared with the decreased pressure determination index to a value equal to or higher than 1% and equal to or lower than 90% and to detect deflated tires when the decreased pressure determination index exceeds the reduced threshold.

12 Claims, 2 Drawing Sheets

SYSTEM, METHOD, AND PROGRAM FOR DETECTING DEFLATED TIRES

TECHNICAL FIELD

The present invention relates to a system, a method, and a program for detecting deflated tires. More particularly, the present invention relates to a system, a method, and a program for detecting deflated tires using the rotation speed information of tires attached to a vehicle.

BACKGROUND ART

In order to secure the safe driving of automobiles, various tire air pressure warning system (Tire Pressure Monitoring System; TPMS) have been conventionally suggested according to which a decreased air pressure of a tire attached to the vehicle is detected to warn the driver for an appropriate treatment.

A conventional TPMS can be classified into two types of the direct TPMS and the indirect TPMS. The direct TPMS provides a pressure sensor in a tire to thereby directly measure the tire pressure. The direct TPMS can detect a decrease in the pressure at a high accuracy but requires exclusive wheels and is involved with some disadvantages in the markets, thus leaving technical and cost disadvantages.

The indirect TPMS is a method of estimating the air pressure based on the tire rotation information. The indirect TPMS can be further classified into the Dynamic Loaded Radius (DLR) method and the Resonance Frequency Method (RFM).

The DLR method is a method that uses a phenomenon according to which deflated tires is collapsed and thus the tire has a reduced dynamic loaded radius and is consequently rotated at a higher speed than other tires with a normal pressure. The DLR method compares the rotation speeds of the four tires to thereby detect deflated tires (see Patent Literature 1 for example).

The RFM method on the other hand is a method to use a fact that deflated tires has a different wheel speed signal frequency characteristic to thereby detect a difference from a normal pressure. In contrast with the DLR method, the RFM method is an absolute comparison with the normal values of the respective wheels that are retained in advance. Thus, the RFM method also can detect the four tires simultaneous deflation condition. Thus, the RFM method attracts attentions as a better indirect detection method (see Patent Literature 2 for example). In case of the RFM method, attention is paid on the resonance frequency obtained by the frequency analysis of wheel speed signals. Then, warning is issued when it is determined that the resonance frequency is relatively lower than a reference frequency assumed during the calibration.

By the way, the current situation is that the regulation-compatible indirect TPMS can detect a deflated tire and three tires with a normal pressure, two deflated tires (decreased pressures of the same level) and two tires with normal pressure, three deflated tires (decreased pressures of the same level) and a tire with a normal pressure, and four deflated tires (decreased pressures of the same level). The detection level is set so that, in consideration of the convenience in the market, no warning is issued at a 10%-deflation condition for example and requirements specified by regulations (North America: 25%-deflation condition, Europe: 20%-deflation condition) are satisfied.

Among the above-described various deflation conditions, one deflated tire and three tires with a normal pressure, two diagonal deflated tires and other two tires with a normal pressure, and three deflated tires and one tire with a normal pressure can be detected by comparison of DLRs of the two diagonal tires to each other. Two rear axle deflated tires (decreased pressures of the same level) and two front axle tires with a normal pressure can be detected by comparison of the DLRs of two coaxial tires to each other. The same side deflated tires (right side or left side) (decreased pressures of the same level) and two tires with a normal pressure can be detected by comparison of the DLRs of the two tires of the same side to each other. Two front axle deflated tires (decreased pressures of the same level) and two rear axle tires with a normal pressure four deflated tires (decreased pressures of the same level) can be detected by the RFM method.

CITATION LIST

Patent Literature

{PTL1} Japanese Unexamined Patent Publication No. 1988-305011
{PTL2} Japanese Unexamined Patent Publication No. 2009-274639

SUMMARY OF INVENTION

Technical Problem

However, various combinations of deflated tires as described above are based on a theory that any wheel has a similar level of a decreased pressure. In reality, wheels have various levels of decreased pressures, which means that there are a countless number of combinations of deflated tires. In case of the conventional indirect TPMS, two modules of an RFM method and a DLR method are used. Among these two modules, the RFM method can detect one deflated tire but has a difficulty in finding a resonance frequency of a tire at light load. Thus, the RFM method has a not-so-high accuracy to detect a rear axle deflated tire at light load (since most vehicles include therein an engine mounted at the front side of the vehicle body, rear axle tires are loaded not so much when the number of passengers and the loading weight are small). Thus, the RFM method is generally used to detect only two front axis deflated tires. In case of the DLR method on the other hand, the wheel speeds of four wheels are subjected to a relative comparison. Thus, the DLR method cannot detect a decreased pressure when a difference in the wheel speed is small.

For example, a case is assumed, among a countless number of combinations of deflated tires, one 20% deflated front axle tire, one 10% deflated front axle tire and two 10% deflated rear axle tires. In this case, since the DLR method is based on a relative comparison, the DLR method detects a substantially-10%-decreased pressure (20%−10%=10%) through the relative comparison of two diagonal wheels, two coaxial wheels, and two wheels of the same side, thus failing to detect a decreased pressure. The RFM method on the other hand can detect a decreased pressure through the independent monitoring of each wheel of two front axle tires.

However, the above two methods cannot detect both two 10% deflated front axle tires, one 10% deflated rear axle tire, and the other one 20% deflated tire. Specifically, the RFM method for monitoring two front axle tires cannot detect a decreased pressure because the front axle has a decreased pressure level of 10% (which is lower than the detection level). The DLR method also cannot detect a decreased pressure because the DLR method detects a level equal to or lower than a substantially-10%-decreased pressure (20%–10%=10%) through the relative comparison of the wheel speeds.

As described above, the conventional system sometimes could not detect complex combinations of deflated tires where tires have different levels of decreased pressures, even when there was a 20% deflated tire.

The present invention has been made in view of the situation as described above. It is an objective of the invention to provide a system, a method, and a program for detecting deflated tires according to which even complex combinations of different level deflated tires can be detected.

Solution to Problem (1) In accordance with the first aspect of the present invention, there is provided a system for detecting deflated tires (hereinafter also may be simply referred to as "detection system") based on a resonance frequency of tires attached to a vehicle and a relative comparison value of rotation speeds of the tires, including:

a rotation information detection means for detecting rotation information of the tires;

a rotation speed calculation means for calculating rotation speeds of the tires based on the rotation information detected by the rotation information detection means;

a resonance frequency assumption means for assuming a resonance frequency of the tires based on the rotation information of the tires; and a determination means for determining deflated tires using a decreased pressure determination value calculated by a relative comparison of the rotation speeds of the tires and the resonance frequency assumed by the resonance frequency assumption means, wherein the determination means is so configured, assuming that the first determination index at which warning is issued when the resonance frequency exceeds the first threshold a predetermined number of times is 100 in determining deflated tires based on the resonance frequency and when the first determination index has a converted percentage equal to or higher than 10 and lower than 100, as to reduce the second threshold to be compared with the decreased pressure determination index to a value equal to or higher than 1% and equal to or lower than 90% and to determine deflated tires when the decreased pressure determination index exceeds the reduced threshold.

(2) In the detection system of (1), the determination means may be so configured as to reduce, when the first determination value has a converted percentage equal to or higher than 70 and lower than 90, the second threshold to be compared with the decreased pressure determination index to a value equal to or higher than 1% and equal to and lower than 50% and to determine deflated tires when the decreased pressure determination index exceeds the reduced threshold.

(3) In accordance with the second aspect of the present invention, there is provided a system for detecting deflated tires based on a resonance frequency of tires attached to a vehicle and a relative comparison value of rotation speeds of the tires, including:

a rotation information detection means for detecting rotation information of the tires;

a rotation speed calculation means for calculating rotation speeds of the tires based on the rotation information detected by the rotation information detection means;

a resonance frequency assumption means for assuming a resonance frequency of the tires based on the rotation information of the tires; and a determination means for determining deflated tires using a decreased pressure determination index calculated by a relative comparison of the rotation speeds of the tires and the resonance frequency assumed by the resonance frequency assumption means, wherein the determination means is so configured, assuming that a first determination index at which warning is issued when the resonance frequency exceeds the first threshold a predetermined number of times is 100 in determining deflated tires based on the resonance frequency and when the first determination index has a converted percentage equal to or higher than 10 and lower than 100, as to determine deflated tires, assuming that the second determination index at which warning is issued when the decreased pressure determination index exceeds the second threshold a predetermined number of times is 100 and when the second determination index has a converted percentage equal to or higher than 10 and lower than 100.

(4) In the detection system of (3), the determination means may be so configured as to determine deflated tires when the first determination index has a converted percentage equal to or higher than 70 and lower than 90 and when the second determination index has a converted percentage equal to or higher than 50 and lower than 100.

(5) In accordance with the third aspect of the present invention, there is provided a method of detecting deflated tires (hereinafter also may be simply referred to as "detection method") based on a resonance frequency of tires attached to a vehicle and a relative comparison value of rotation speeds of the tires, including:

a rotation information detection step for detecting rotation information of the tires;

a rotation speed calculation step for calculating rotation speeds of the tires based on the rotation information detected in the rotation information detection step;

a resonance frequency assumption step for assuming a resonance frequency of the tires based on the rotation information of the tires; and a determination step for determining deflated tires using a decreased pressure determination index calculated by a relative comparison of the rotation speeds of the tires and the resonance frequency assumed in the resonance frequency assumption step, wherein the determination step is so configured, assuming that the first determination index at which warning is issued when the resonance frequency exceeds the first threshold a predetermined number of times is 100 in determining deflated tires based on the resonance frequency and when the first determination index has a converted percentage equal to or higher than 10 and lower than 100, as to reduce the second threshold to be compared with the decreased pressure determination index to a value equal to or higher than 1% and equal to or lower than 90% and to determine deflated tires when the decreased pressure determination index exceeds the reduced threshold.

(6) In the detection method of (5), the determination step may be so configured as to reduce, when the first determination index has a converted percentage equal to or higher than 70 and lower than 90, the second threshold to be compared with the decreased pressure determination index to a value equal to or higher than 1% and equal to and lower than 50% and to determine deflated tires when the decreased pressure determination index exceeds the reduced threshold.

(7) In accordance with the fourth aspect of the present invention, there is provided a method for detecting deflated tires based on a resonance frequency of tires attached to a vehicle and a relative comparison value of rotation speeds of the tires, including:

a rotation information detection step for detecting rotation information of the tires;

a rotation speed calculation step for calculating rotation speeds of the tires based on the rotation information detected in the rotation information detection step;

a resonance frequency assumption step for assuming a resonance frequency of the tires based on the rotation information of the tires; and a determination step for determining deflated tires using a decreased pressure determination index calculated by a relative comparison of the rotation speeds of the tires and the resonance frequency assumed by the resonance frequency assumption step, wherein the determination step is so configured, assuming that the first determination index at which warning is issued when the resonance frequency exceeds the first threshold a predetermined number of times is 100 in determining deflated tires based on the resonance frequency and when the first determination index has a converted percentage equal to or higher than 10 and lower than 100, as to determine deflated tires, assuming that the second determination index at which warning is issued when the decreased pressure determination index exceeds the second threshold a predetermined number of times is 100 and when the second determination index has a converted percentage equal to or higher than 10 and lower than 100.

(8) In the detection method of (7), the determination step may be so configured as to determine deflated tires when the first determination value has a converted percentage equal to or higher than 70 and lower than 90 and when the second determination index has a converted percentage equal to or higher than 50 and lower than 100.

(9) In accordance with the fifth aspect of the present invention, there is provided a program for detecting deflated tires (hereinafter also may be simply referred to as "program") for causing, in order to detect deflated tires based on a resonance frequency of tires attached to a vehicle and a relative comparison value of rotation speeds of the tires, a computer to function as:

a rotation speed calculation means for calculating rotation speeds of the tires based on rotation information detected by a rotation information detection means for detecting rotation information of the tires;

a resonance frequency assumption means for assuming a resonance frequency of the tires based on the rotation information of the tires; and a determination means for determining deflated tires using a decreased pressure determination index calculated by a relative comparison of the rotation speeds of the tires and the resonance frequency assumed by the resonance frequency assumption means, wherein the determination means is so configured, assuming that the first determination index at which warning is issued when the resonance frequency exceeds the first threshold a predetermined number of times is 100 in determining deflated tires based on the resonance frequency and when the first determination value has a converted percentage equal to or higher than 10 and lower than 100, as to reduce the second threshold to be compared with the decreased pressure determination index to a value equal to or higher than 1% and equal to or lower than 90% and to determine deflated tires the decreased pressure determination index exceeds the reduced threshold.

(10) In the program of (9), the determination means may be so configured as to reduce, when the first determination index has a converted percentage equal to or higher than 70 and lower than 90, the second threshold to be compared with the decreased pressure determination to a value equal to or higher than 1% and equal to and lower than 50% and to determine deflated tires when the decreased pressure determination index exceeds the reduced threshold.

(11) In accordance with the sixth aspect of the present invention, there is provided a program for detecting deflated tires for causing, in order to detect deflated tires based on a resonance frequency of tires attached to a vehicle and a relative comparison value of rotation speeds of the tires, a computer to function as:

a rotation speed calculation means for calculating rotation speeds of the tires based on rotation information detected by a rotation information detection means for detecting rotation information of the tires;

a resonance frequency assumption means for assuming a resonance frequency of the tires based on the rotation information of the tires; and a determination means for determining deflated tires using a decreased pressure determination index calculated by a relative comparison of the rotation speeds of the tires and the resonance frequency assumed by the resonance frequency assumption means, wherein the determination means is so configured, assuming that the first determination index at which warning is issued when the resonance frequency exceeds the first threshold a predetermined number of times is 100 in determining deflated tires based on the resonance frequency and when the first determination index has a converted percentage equal to or higher than 10 and lower than 100, as to determine deflated tires, assuming that the second determination index at which warning is issued when the decreased pressure determination index exceeds the second threshold a predetermined number of times is 100 and when the second determination index has a converted percentage equal to or higher than 10 and lower than 100.

(12) In the computer of (11), the determination means may be so configured as to determine deflated tires when the first determination index has a converted percentage equal to or higher than 70 and lower than 90 and when the second determination index has a converted percentage equal to or higher than 50 and lower than 100.

Advantageous Effects of Invention

According to the detection system, the method, and the program of the present invention, a decreased pressure can be detected even when there are deflated tires with different pressures levels.

DESCRIPTION OF EMBODIMENTS

Figure 1:
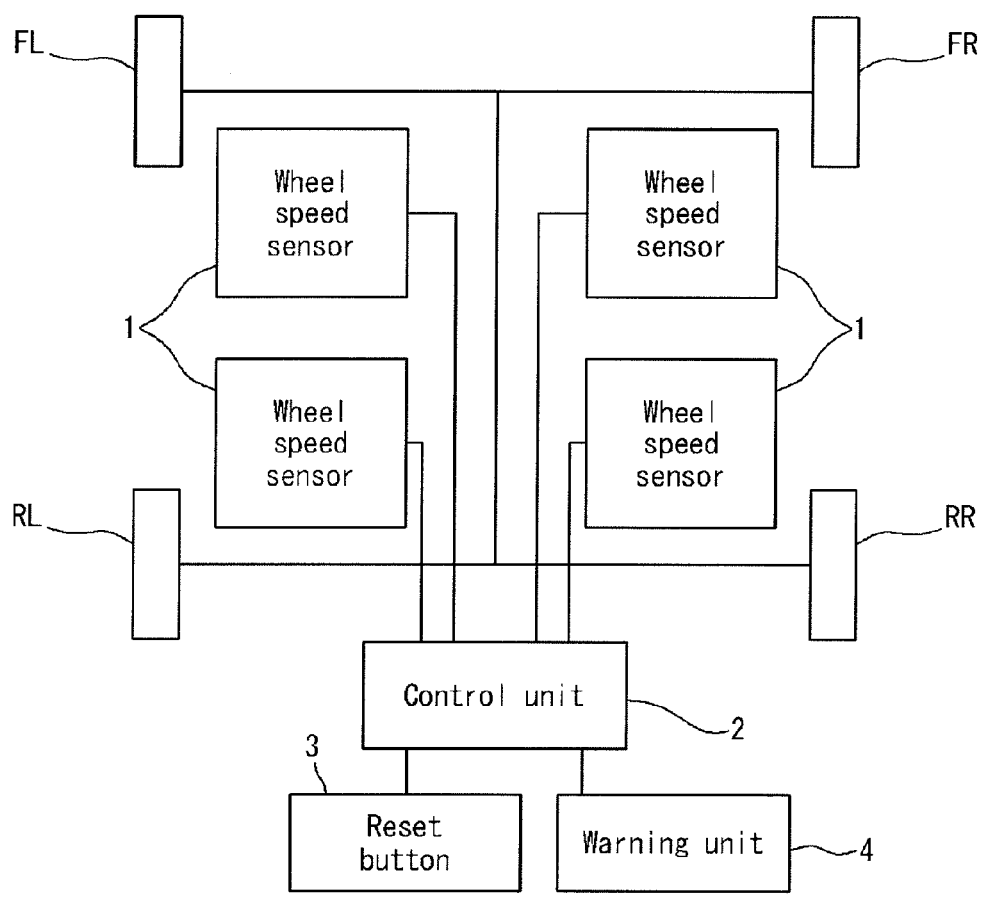
FIG. 1 is a block diagram illustrating one embodiment of a detection system of the present invention.

Hereinafter, with reference to the attached drawings, an embodiment of a detection system, a method, and a program of the present invention will be described in detail. FIG. 1 is a block diagram illustrating one embodiment of a detection system of the present invention, and FIG. 2 is a block diagram illustrating an electric configuration of the detection system shown in FIG. 1.

As shown in FIG. 1, a detection system according to one embodiment of the present invention includes, in order to detect the rotation speeds of four tires provided in a four-wheel vehicle (a left front wheel (FL), a right front wheel (FR), a left rear wheel (RL), and a right rear wheel (RR)), a normal wheel speed sensor (rotation speed information detection means) 1 provided to be associated with the respective tires.

The wheel speed sensor 1 may be, for example, a wheel speed sensor that uses an electromagnetic pickup for example to generate a rotation pulse to measure a rotation angle speed and a wheel speed based on the number of pulses or an angular velocity sensor such as the one that generates power using rotation as in a dynamo to measure a rotation angle speed and a wheel speed based on the voltage. The output from the wheel speed detection means 1 is given to a control unit 2 that is a computer such as ABS. This control unit 2 is connected to a reset button 3 that can be operated by a driver and an warning unit 4 for notifying the driver of deflated tires.

Figure 2:
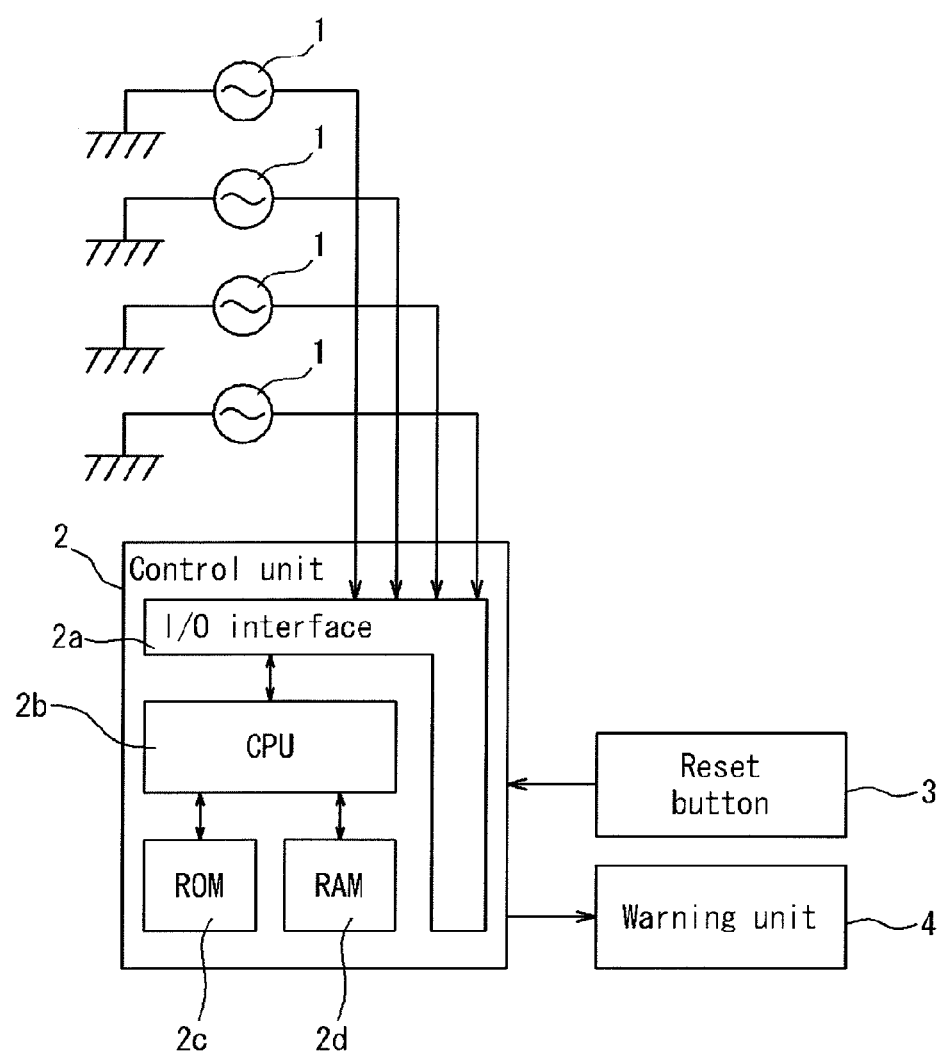
FIG. 2 is a block diagram illustrating an electric configuration of the detection system shown in FIG. 1.

As shown in FIG. 2, the control unit 2 is composed of: an I/O interface 2a required for the exchange of a signal with an external system; a CPU 2b functioning as a computation processing center; a ROM 2c storing therein a control operation program of this CPU 2b; and a RAM 2d to which data is temporarily written or from which the written data is read out when the CPU 2b performs a control operation.

The wheel speed sensor 1 outputs a pulse signal corresponding to the rotation number of a tire (hereinafter also referred to as "wheel speed pulse"). The CPU 2b calculates, based on the wheel speed pulse outputted from the wheel speed sensor 1 and at every predetermined sampling cycle $\Delta T$ (ms) (e.g., $\Delta T$=40 ms), the rotation angle speed Fi that shows the information for the rotation speeds of the respective tires.

The detection system according to the present embodiment is composed of: the wheel speed sensor 1; a rotation speed calculation process for calculating rotation speeds of tires based on rotation information detected by the rotation information sensor 1; a resonance frequency assumption means for assuming a resonance frequency of the tires based on the rotation information of the tires; and a determination means for determining deflated tires using a decreased pressure determination index calculated by a relative comparison of the rotation speeds of the tires and the resonance frequency assumed by the resonance frequency assumption means. The determination means is so configured: (1) assuming that the first determination index at which warning is issued when the resonance frequency exceeds the first threshold a predetermined number of times is 100 in determining deflated tires based on the resonance frequency and when the first determination index has a converted percentage equal to or higher than 10 and lower than 100, as to reduce the second threshold to be compared with the decreased pressure determination index to a value equal to or higher than 1% and equal to or lower than 90% and to determine deflated tires when the decreased pressure determination index exceeds the reduced threshold, or (2) assuming that the first determination value at which warning is issued when the resonance frequency exceeds the first threshold a predetermined number of times is 100 in determining deflated tires based on the resonance frequency and when the first determination index has a converted percentage equal to or higher than 10 and lower than 100, as to determine deflated tires, assuming that the second determination index at which warning is issued when the decreased determination index exceeds the second threshold a predetermined number of times is 100 and when the second determination index has a converted percentage equal to or higher than 10 and lower than 100.

The program according to the present embodiment is installed in the control unit 2. The control unit 2 is caused to function as the rotation speed calculation process, the resonance frequency assumption process, and the determination process.

By the way, tires attached to a vehicle do not always have an identical size. Furthermore, even tires with an identical size are manufactured to include variation within a standard (initial difference). Thus, the respective tires do not always have an identical effective rolling radius (a value obtained by dividing the distance traveled by one rotation by $2\pi$) even when all of the tires have a normal pressure, thus resulting in the respective tires having varied rotational angular velocities Fi. To solve this, it is required to correct in advance the variation of the rotational angular velocity Fi among the respective tires at a normal pressure for example. This correction is generally called calibration and is carried out based on the following method for example when the vehicle tires are set to have a normal pressure by a periodic maintenance. According to this method, the following initial correction coefficients K1, K2, and K3 are calculated.

$$K1 = F1/F2 \tag{1}$$

$$K2 = F3/F4 \tag{2}$$

$$K3 = (F1 + K1 \times F2)/(F2 + K2 \times F4) \tag{3}$$

During the driving after the calibration, the calculated initial correction coefficients K1, K2, and K3 are used to calculate a new rotational angular velocity $F1_i$ as shown in the formulae (4) to (7).

$$F1_1 = F1 \tag{4}$$

$$F1_2 = K1 \times F2 \tag{5}$$

$$F1_3 = K3 \times F3 \tag{6}$$

$$F1_4 = K2 \times K3 \times F4 \tag{7}$$

In the formulae, the initial correction coefficient K1 is a coefficient to correct the difference in the effective rolling radius due to the initial difference between the front left and right tires. The initial correction coefficient K2 is a coefficient to correct the difference in the effective rolling radius due to the initial difference between the rear left and right tires. The initial correction coefficient K3 is a coefficient to correct the difference in the effective rolling radius due to the initial difference between the front left tire and the rear left tire.

Based on the $F1_i$, the wheel speeds Vi of the respective wheels are calculated.

The present embodiment uses, in order to determine deflated tires, both of the RFM method to use the resonance frequency of tires attached to a vehicle and the DLR method to use relative comparison values of rotation speeds of the tires. The respective methods may be selected from among the conventionally-used ones and are not particularly limited in the present invention.

[DLR Method]

For example, the following method can be used as DLR method.

This DLR method uses, in order to determine deflated tires, the following three determination indexes DEL1, DEL2, and DEL3.

(1) The determination index DEL1 is a index that is, as shown in the following formula (8), obtained by, with regard to two pairs of diagonal wheels, deducting from an average of the wheel speeds of one pair of wheels an average of the wheel speeds of the other pair of wheels to divide the resultant difference by an average wheel speed of the four wheels.

$$DEL1=\{(V1+V4)/2-(V2+V3)/2\}/(V\text{mean})\times 100(\%) \tag{8}$$

In the formula, V1 to V4 denote the wheel speeds of the left-front wheel tire, the right-front wheel tire, the left-rear wheel tire, and the right-rear wheel tire, respectively. Vmean is obtained by (V1+V2+V3+V4)/4.

(2) The determination index DEL2 is a index that is, as shown in the following formula (9), obtained by dividing the difference between the average wheel speed of the front wheel tires and the average wheel speed of the rear wheel tires by the average wheel speed of the four wheels.

$$DEL2=\{(V1+V2)/2-(V3+V4)/2\}/(V\text{mean})\times 100(\%) \tag{9}$$

(3) DEL3 is a index that is, as shown in the following formula (10), obtained by dividing the difference between the average wheel speed of the right wheel tires and the average wheel speed of the left wheel tires by the average wheel speed of the four wheels.

$$DEL3=\{(V1+V3)/2-(V2+V4)/2\}/(V\text{mean})\times 100(\%) \tag{10}$$

Then, the determination indexes DEL1 to DEL3 are compared with predetermined thresholds that are calculated by an experiment driving for example and that are stored in the ROM 2c of the control unit 2. When the determination indexes DEL1 to DEL3 are higher than the respective thresholds, it is determined that there are deflated tires, thus causing the warning unit 4 to issue a warning to the driver.

[RFM Method]

On the other hand, the RFM method may be the method disclosed in Patent Literature 2 for example.

In this method, wheel rotation signals are assumed as time series signals to perform the time series assumption on parameters of a linear model of a high order (an order of an integer of 3 or more). Next, based on the respective assumed parameters and outputted wheel rotation time series signals, unknown input signals are assumed. Then, the assumed input signals and the output signals are used to subject the linear model to a system identification.

Specifically, the tire resonance frequency is calculated based on the following procedure.

(1) First, the wheel speed detection means is used to detect a wheel rotation signal.

(2) Next, the wheel rotation signal is resampled based on a predetermined sampling cycle to obtain time series data of the wheel speed signal. Since the resonance frequency in the torsion direction of the target tire appears in the vicinity of several tens of Hz, the sampling cycle must be equal to or higher than this value.

(3) Next, the resultant wheel speed is subjected to a differential process to obtain wheel acceleration. Although the wheel speed data can be subjected to a time series analysis as time series data, since the wheel acceleration data has a smaller change than that of the wheel speed data, the wheel acceleration data is preferably used as the time series data from the viewpoint of an increased calculation accuracy.

(4) Next, the calculated wheel rotation acceleration data is used as time series data and is subjected to a time series analysis.

The first step assumes the rotation acceleration data as time series signals to compose a linear model of the nth order (n is an integer of 3 or more) based on the following formula (11). Based on the linear model, the time series assumption means subjects the respective parameters to a time series assumption. The time series assumption is preferably performed using the iterative least squares technique in consideration of the computer resource.

$$y(k) = \sum_{i=1}^{n} a_i y(k-i) + w(k) \tag{11}$$

In the formula, y(k) shows a time series signal of the wheel rotation acceleration, n shows the model order (an integer of 3 or more), $a_i$ shows each parameter, and w(k) shows disturbance.

(5) Next, in the second step, based on the respective parameters assumed in the first step and the time series signal y(k) of the wheel rotation acceleration as an output signal, an input is assumed by the input signal assumption means.

Specifically, in time series assumption in the first step, an input into the system is defined as the disturbance w(k). This disturbance w(k) is assumed as white noise-like force caused from the road surface. Such a disturbance w(k) (i.e., input signal) is assumed based on the respective parameters assumed in the first step and the time series signal of the wheel rotation acceleration based on the following formula (12).

$$w(k) = y(k) - \sum_{i=1}^{n} a_i y(k-i) \tag{12}$$

(6) Next, in the third step, based on the input signal w(k) assumed in the second step and the time series signal y(k) of the wheel rotation acceleration as an output signal, the parameter of a second-order model is identified by a parameter identification means. In this process, a transfer function G(z) can be represented by the following formula (13).

$$G(z) = \frac{c_0 z^2 + c_1 z + c_2}{z^2 + b_1 z + b_2} \tag{13}$$
$$= \frac{c_0 + c_1 z^{-1} + c_2 z^{-2}}{1 + b_1 z^{-1} + b_2 z^{-2}}$$

In the formula, $z^{-1}$ shows one sample delay.

Prior to the reduction of the order to the second order, in order to pay attention on the tire resonance frequency in particular, the input signal and the output signal are preferably subjected to a filtering processing by a filter means having a predetermined passband width to subsequently perform a system identification.

(7) Then, based on the parameter of the model for which the order was reduced to the second order, the resonance frequency assumption means assumes the resonance frequency. When the resonance characteristic is approximated to a continuous time second-order model formula (14), the resonance frequency is represented by the following formula (15).

$$G(s) = \frac{\omega_n^2}{s^2 + 2\zeta\omega_n s + \omega_n^2} \tag{14}$$

$$\omega_p = \omega_n \sqrt{1 - 2\zeta^2} \tag{15}$$

In the formula, $\omega_n$ shows a natural frequency, $\xi$ shows an attenuation coefficient, and $\omega_p$ shows a resonance frequency.

The method of assuming (or detecting) the resonance frequency is not limited to the above-described one and may be appropriately selected from among known methods.

In the present embodiment, a DLR method module and an RFM method module, which have been conventionally set to operate independently, are set to operate while being associated to each other.

Deflated tires are detected based on the DLR method and the RFM method that both use a determination index, a warning threshold, and a warning determination index. The DLR method provides a determination index based on the comparison between two diagonal wheels, two coaxial wheels, and two wheels of the same side. The RFM method provides a determination index based on a resonance frequency.

These determination indexes are compared with the warning threshold. When the determination indexes exceed the warning threshold, the count of the warning determination index is increased or decreased. Then, whether a warning should be issued or not is determined based on the warning determination value.

The reason why the warning determination index is used is that, if the determination indexes exceeding the warning threshold immediately results in a warning, a false warning may be caused with a high possibility and thus the system reliability may be deteriorated.

Another configuration is also possible in which a shorter warning time and an improved accuracy can be provided by a plurality of warning thresholds so that the count is increased or decreased in a weighted manner based on the respective warning thresholds.

The determination index and the warning determination index generally are a index between a normal pressure and a decreased pressure. The levels of the determination index and the warning determination index depend on the tuning status of the detection level.

In the present specification, the first threshold means the "warning threshold" in the RFM method. The first determination index means the "warning determination index" in the RFM method. The second index value means the "warning threshold" in the DLR method. The second determination index means the "warning determination index" in the DLR method. The calculated resonance frequency and decreased pressure determination index are subjected to an averaging processing at every predetermined unit time (e.g., 1 second) and are compared with the respective thresholds. When the thresholds are exceeded, the warning determination index is increased by one. When the calculated resonance frequency and decreased pressure determination index at the subsequent predetermined unit time are lower than the thresholds on the other hand, the warning determination index is decreased by one. As described above, when a predetermined count is reached, deflated tires is detected and warning is issued.

The present invention is based on a concept that the determination index and the warning determination index exist between a normal pressure and a decreased pressure to be detected. A predetermined decreased pressure can be detected even in the case of the above-described complex combination of decreased pressures.

Specifically, when the warning determination index has a converted percentage equal to or higher than 10 and lower than 100 assuming that the warning determination value in the RFM method is 100, then the threshold to be compared with the decreased pressure determination index in the DLR method is reduced to a index equal to or higher than 1% and equal to or lower than 90%, and when the decreased pressure determination index exceeds the reduced threshold, deflated tires are detected. For example, when the warning determination index in the RFM method has a converted percentage that is 50, then the threshold in the DLR method is set to ½, thus providing the detection of a decreased pressure even in the case of a complex combination of deflated tires. From the viewpoint of reducing the possibility of a false warning while improving the detection accuracy, the threshold in the DLR method is preferably reduced when the warning determination index in the RFM method has a converted percentage value equal to or higher than 70 and lower than 90.

Similarly, when the warning determination index has a converted percentage equal to or higher than 10 and lower than 100 assuming that the warning determination index in the RFM method is 100, and when the warning determination index has a converted percentage equal to or higher than 10 and lower than 100 assuming that the warning determination index in the DLR method is 100, deflated tires are detected. For example, when the warning determination index in the RFM method has a converted percentage of 50 and when the warning determination index in the DLR method has a converted percentage of 50, deflated tires are detected, thus providing the detection of a decreased pressure even in case of a complex combination of deflated tires.

The threshold of the determination index and the level of the warning determination index to be changed depend on the detection level of each vehicle and/or each tire. Thus, although the above section has described that the decreased pressure determination index in the DLR method is reduced to a value equal to or higher than 1% and equal to or lower than 90%, when considering the convenience in the market, the decreased pressure determination index in the DLR method is preferably reduced to an index equal to or higher than 1% and equal to or lower than 50%. Although the above section has described that a decreased pressure is determined when the warning determination index in the DLR method has a converted percentage equal to or higher than 10 and lower than 100, when also considering the convenience in the market, a decreased pressure is preferably determined when the warning determination index in the DLR method reaches an index equal to or higher than 50 and equal to or lower than 100.

Example and Comparative Example

Next, the detection method of the present invention will be described based on examples. However, the present invention is not limited to such an examples.

Examples 1 to 8

To a Front Wheel Drive (FWD) vehicle, 16 inches all-season tires were attached and the vehicle was caused to drive on a circle road on a test course. The tire air pressure was adjusted to have a predetermined vehicle set pressure. Then, the vehicle was caused to drive at about 80 kph for about 20 minutes and was subjected to calibration.

Next, the two front wheels were set to a 10%-decreased pressure, the rear left wheel was set to a 20%-decreased pressure, and the rear right wheel was set to a 10%-decreased pressure. Then, the vehicle was caused to run at about 80 kph for about 20 minutes. The warning determination index in the RFM method and the warning determination index in the DLR method were set as shown in Table 1, respectively. Then, the performance for detecting deflated tires was checked. The result is shown in Table 1. In Table 1, the warning determination index in the RFM method and the warning determination index in the DLR method show a converted percentage of the warning determination index when the warning determination index in case of independently issuing a warning by each method was assumed as 100.

Comparative Example

The performance for detecting deflated tires was checked in the same manner as in Example 1, except that the alarm determination value in the RFM method and the warning determination index in the DLR method of 100 were directly used without any change and the RFM method and the DLR method were caused to function independently. The result is shown in Table 1.

TABLE 1

|  | Setting of RFM warning determination index | Setting of DRL warning determination index | Detection time |
|---|---|---|---|
| Example 1 | 50 | 50 | 5 minutes and 37 seconds |
| Example 2 | 80 | 90 | 9 minutes and 52 seconds |
| Example 3 | 70 | 50 | 7 minutes and 48 seconds |
| Example 4 | 30 | 80 | 6 minutes and 7 seconds |
| Example 5 | 90 | 40 | 9 minutes and 46 seconds |
| Example 6 | 10 | 50 | 3 minutes and 55 seconds |
| Example 7 | 50 | 10 | 4 minutes and 46 seconds |
| Example 8 | 10 | 10 | 2 minutes and 12 seconds |
| Comparative Example | 100 | 100 | Not detected |

REFERENCE SIGNS LIST

1 Wheel speed sensor
2 Control unit
2a Interface
2b CPU
2c ROM
2d RAM
3 Reset button
4 Warning unit

What is claimed is:

1. A system for detection of deflated tires based on a resonance frequency of tires attached to a vehicle and a relative comparison index of rotation speeds of the tires, comprising:
a rotation information detection means for detecting rotation information of the tires;
a rotation speed calculation means for calculating rotation speeds of the tires based on the rotation information detected by the rotation information detection means;
a resonance frequency assumption means for assuming a resonance frequency of the tires based on the rotation information of the tires; and
a determination means for detection of deflated tires using a decreased pressure determination index calculated by a relative comparison of the rotation speeds of the tires and the resonance frequency assumed by the resonance frequency assumption means,
wherein the determination means is so configured, assuming that the first determination index at which warning is issued when the resonance frequency exceeds the first threshold a predetermined number of times is 100 in detecting deflated tires based on the resonance frequency and when the first determination index has a converted percentage equal to or higher than 10 and lower than 100, as to reduce the second threshold to be compared with the decreased pressure determination index to a value equal to or higher than 1% and equal to or lower than 90% and to detect deflated tires having a decreased pressure when the decreased pressure determination index exceeds the reduced threshold.

2. The system according to claim 1, wherein the determination means is so configured as to reduce, when the first determination index has a converted percentage equal to or higher than 70 and lower than 90, the second threshold to be compared with the decreased pressure determination index to an index equal to or higher than 1% and equal to and lower than 50% and to detect deflated tires when the decreased pressure determination index exceeds the reduced threshold.

3. A system for detection of deflated tires based on a resonance frequency of tires attached to a vehicle and a relative comparison index of rotation speeds of the tires, comprising:
a rotation information detection means for detecting rotation information of the tires;
a rotation speed calculation means for calculating rotation speeds of the tires based on the rotation information detected by the rotation information detection means;
a resonance frequency assumption means for assuming a resonance frequency of the tires based on the rotation information of the tires; and
a determination means for detection of deflated tires using a decreased pressure determination index calculated by a relative comparison of the rotation speeds of the tires and the resonance frequency assumed by the resonance frequency assumption means,
wherein the determination means is so configured, assuming that the first determination index at which warning is issued when the resonance frequency exceeds the first threshold a predetermined number of times is 100 in detecting deflated tires based on the resonance frequency and when the first determination index has a converted percentage equal to or higher than 10 and lower than 100, as to detect deflated tires, assuming that the second determination index at which warning is issued when the decreased pressure determination index exceeds the second threshold a predetermined number of times is 100 and when the second determination index has a converted percentage equal to or higher than 10 and lower than 100.

4. The system according to claim 3, wherein the determination means is so configured as to detect deflated tires when the first determination index has a converted percentage equal to or higher than 70 and lower than 90 and when the second determination index has a converted percentage equal to or higher than 50 and lower than 100.

5. A method of detecting deflated tires based on a resonance frequency of tires attached to a vehicle and a relative comparison index of rotation speeds of the tires, including:
a rotation information detection step for detecting rotation information of the tires;
a rotation speed calculation step for calculating rotation speeds of the tires based on the rotation information detected in the rotation information detection step;
a resonance frequency assumption step for assuming a resonance frequency of the tires based on the rotation information of the tires; and
a determination step for detection of deflated tires using a decreased pressure determination index calculated by a relative comparison of the rotation speeds of the tires and the resonance frequency assumed in the resonance frequency assumption step, wherein the determination step is so configured, assuming that the first determination index at which warning is issued when the resonance frequency exceeds the first threshold a predetermined number of times is 100 in detecting deflated tires having a decreased air pressure based on the resonance frequency and when the first determination index has a converted percentage equal to or higher than 10 and lower than 100, as to reduce the second threshold to be compared with the decreased pressure determination index to an index equal to or higher than 1% and equal to or lower than 90% and to detect deflated tires when the decreased pressure determination index exceeds the reduced threshold.

6. The method according to claim 5, wherein the determination step is so configured as to reduce, when the first determination index has a converted percentage equal to or higher than 70 and lower than 90, the second threshold to be compared with the decreased pressure determination index to a value equal to or higher than 1% and equal to and lower than 50% and to detect deflated tires when the decreased pressure determination index exceeds the reduced threshold.

7. A method of detecting deflated tires based on a resonance frequency of tires attached to a vehicle and a relative comparison index of rotation speeds of the tires, including:

a rotation information detection step for detecting rotation information of the tires;

a rotation speed calculation step for calculating rotation speeds of the tires based on the rotation information detected in the rotation information detection step;

a resonance frequency assumption step for assuming a resonance frequency of the tires based on the rotation information of the tires; and a determination step for detection of deflated tires using a decreased pressure determination index calculated by a relative comparison of the rotation speeds of the tires and the resonance frequency assumed by the resonance frequency assumption step, wherein the determination step is so configured, assuming that the first determination index at which warning is issued when the resonance frequency exceeds the first threshold a predetermined number of times is 100 in detecting deflated tires based on the resonance frequency and when the first determination index has a converted percentage equal to or higher than 10 and lower than 100, as to detect deflated tires, assuming that the second determination index at which warning is issued when the decreased pressure determination index exceeds the second threshold a predetermined number of times is 100 and when the second determination index has a converted percentage equal to or higher than 10 and lower than 100.

8. The method according to claim 7, wherein the determination step is so configured as to detect deflated tires when the first determination index has a converted percentage equal to or higher than 70 and lower than 90 and when the second determination index has a converted percentage equal to or higher than 50 and lower than 100.

9. A program for detection of deflated tires causing, in order to detect deflated tires based on a resonance frequency of tires attached to a vehicle and a relative comparison value of rotation speeds of the tires, a computer to function as:

a rotation speed calculation means for calculating rotation speeds of the tires based on rotation information detected by a rotation information detection means for detecting rotation information of the tires;

a resonance frequency assumption means for assuming a resonance frequency of the tires based on the rotation information of the tires; and a determination means for detection of deflated tires using a decreased pressure determination index calculated by a relative comparison of the rotation speeds of the tires and the resonance frequency assumed by the resonance frequency assumption means, wherein the determination means is so configured, assuming that the first determination index at which warning is issued when the resonance frequency exceeds the first threshold a predetermined number of times is 100 in detecting deflated tires based on the resonance frequency and when the first determination index has a converted percentage equal to or higher than 10 and lower than 100, as to reduce the second threshold to be compared with the decreased pressure determination index to a value equal to or higher than 1% and equal to or lower than 90% and to detect deflated tires when the decreased pressure determination index exceeds the reduced threshold.

10. The program according to claim 9, wherein the determination means is so configured as to reduce, when the first determination value has a converted percentage equal to or higher than 70 and lower than 90, the second threshold to be compared with the decreased pressure determination index to an index equal to or higher than 1% and equal to and lower than 50% and to detect deflated tires when the decreased pressure determination index exceeds the reduced threshold.

11. A program for detection of deflated tires for causing, in order to detect deflated tires based on a resonance frequency of tires attached to a vehicle and a relative comparison index of rotation speeds of the tires, a computer to function as:

a rotation speed calculation means for calculating rotation speeds of the tires based on rotation information detected by a rotation information detection means for detecting rotation information of the tires;

a resonance frequency assumption means for assuming a resonance frequency of the tires based on the rotation information of the tires; and a determination means for detection of deflated tires using a decreased pressure determination index calculated by a relative comparison of the rotation speeds of the tires and the resonance frequency assumed by the resonance frequency assumption means, wherein the determination means is so configured, assuming that the first determination value at which warning is issued when the resonance frequency exceeds the first threshold a predetermined number of times is 100 in detecting deflated tires based on the resonance frequency and when the first determination has a converted percentage equal to or higher than 10 and lower than 100, as to detect deflated tires, assuming that the second determination index at which warning is issued when the decreased pressure determination index exceeds the second threshold index a predetermined number of times is 100 and when the second determination index has a converted percentage equal to or higher than 10 and lower than 100.

12. The program according to claim 11, wherein the determination means is so configured as to detect deflated tires when the first determination index has a converted percentage equal to or higher than 70 and lower than 90 and when the second determination index has a converted percentage equal to or higher than 50 and lower than 100.

* * * * *